Figure 1:
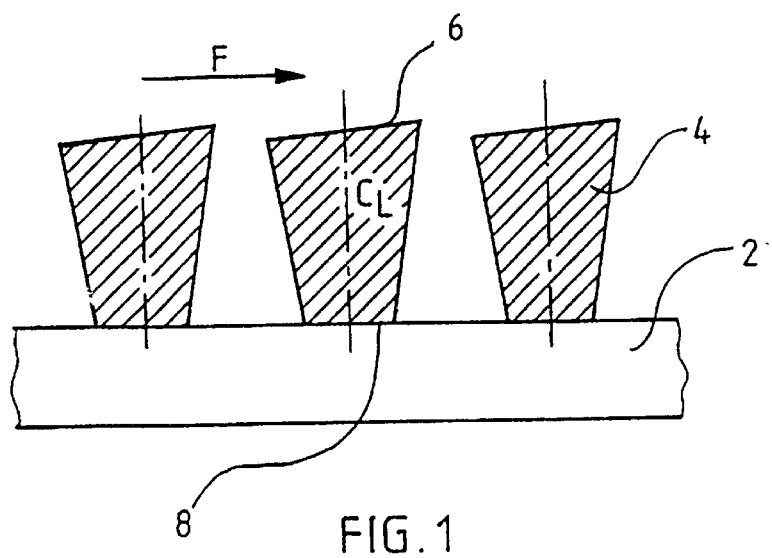

United States Patent
Ljokkoi et al.

[11] Patent Number: 6,119,867
[45] Date of Patent: Sep. 19, 2000

[54] SCREEN CYLINDER

[75] Inventors: Risto Ljokkoi; Pertti Wathen, both of Karhula, Finland

[73] Assignee: Ahlmstrom Machinery Oy, Helsinki, Finland

[21] Appl. No.: 09/077,632
[22] PCT Filed: Nov. 27, 1996
[86] PCT No.: PCT/FI96/00638
   § 371 Date: May 28, 1998
   § 102(e) Date: May 28, 1998
[87] PCT Pub. No.: WO97/20103
   PCT Pub. Date: Jun. 5, 1997

[30] Foreign Application Priority Data

Nov. 28, 1995 [FI] Finland .................................... 955726

[51] Int. Cl.[7] .............................. B07B 1/04; B01D 1/20; B01D 1/49; B01D 21/26
[52] U.S. Cl. .......................... 209/273; 209/306; 209/397; 210/512.1
[58] Field of Search .......................... 210/512.1; 209/273, 209/281, 283, 305, 306, 397, 399

[56] References Cited

U.S. PATENT DOCUMENTS

| | | | |
|---|---|---|---|
| 4,309,284 | 1/1982 | Morimoto et al. | 209/306 |
| 5,059,324 | 10/1991 | Chen | 209/273 |
| 5,128,026 | 7/1992 | Lamort | 209/273 |
| 5,255,790 | 10/1993 | Einoder et al. | 209/395 X |
| 5,259,512 | 11/1993 | Czerwoniak | 209/273 |
| 5,513,757 | 5/1996 | Papetti | 209/273 |
| 5,524,770 | 6/1996 | LeBlanc et al. | 209/306 |
| 5,607,589 | 3/1997 | Frejborg | 209/306 |
| 5,624,558 | 4/1997 | Aaltonen et al. | 209/273 |
| 5,687,853 | 11/1997 | Akew | 209/393 X |
| 5,727,316 | 3/1998 | Riendeau | 209/397 |

FOREIGN PATENT DOCUMENTS

JP-U-01-89991 of 1989 Japan.

OTHER PUBLICATIONS

PA–21097MK, Translation of Official Action for Japanese Patent Appln. No. 520216/97; Mailing Date Aug. 17. 1999; 4 of 4 pp. ASAMURA'S COMMENTS, 1 through 6 of 6 comments, 2 of 2 pp.

*Primary Examiner*—Donald P. Walsh
*Assistant Examiner*—Brett A Martin
*Attorney, Agent, or Firm*—Merchant and Gould P.C.

[57] ABSTRACT

The present invention relates to a screen cylinder for screening fiber suspensions of the wood processing industry. The screen cylinder comprises a rotationally symmetric screen surface located on the side of the pulp to be screened, and support rings supporting the screen surface on the opposite side; the screen surface mainly comprising grooves and screen apertures in connection with the grooves, the grooves being comprised of a side surface on the upstream side, a bottom surface, and a side surface on the downstream side, characterized in that the bottom surface of the groove rises towards the side surface of the upstream side.

11 Claims, 4 Drawing Sheets

SCREEN CYLINDER

The present invention relates to a screen cylinder. In particular the invention relates to a screen cylinder intended for screening fiber suspensions in the wood processing industry.

The wood processing industry uses two basic types of screen drums. One type is a drum made of a metal plate in which screen apertures, either holes or slots, have been manufactured with a desired spacing while the plate is planar after which the plate has been bent cylindrical and the edges have been welded together to form a cylinder. During the past two decades screen plates having certain kinds of grooves machined thereto before the manufacture of the screen apertures have become very popular, the grooves being located in a finished screen drum on the side facing the rotor and substantially parallel with the axis of the drum and the screen apertures are located at the bottom of the grooves.

WO-A-8703024 discloses a straining means which comprises a screen plate having an injection side and an acceptance side for straining of suspensions of cellulose fibers. The screen plate has grooves on both sides thereof and openings through the screen place connecting the grooves on the opposite surfaces of the plate. The openings are either inclined or perpendicular to the screen surface.

EP-A2-0 236 843 discusses a screen plate resembling very much to the screen plate of U.S. Pat. No. 4,529,520. In other words, the screen plate has grooves with an inclined first side surface, an upright second side surface and a bottom surface between the side surfaces. The bottom surface is substantially parallel to the screen plate surface. The only exception to the US patent is that there are two openings one after the other through the bottom surface.

U.S. Pat. No. 5,073,254 discloses yet another version of the so called contoured screen plates. In this version the groove has curved side and bottom surfaces and the openings through the screen plate are positioned to the lowermost part of the groove.

U.S. Pat. No. 5,000,842 discusses a screening apparatus having a screen drum and a rotatable rotor inside the screen drum. The document concentrates mainly on the structure of the rotor but gives a number of different alternatives to the contoured screen plate.

The other basic type of screen drums, the so-called wire screen drums, are usually 10 manufactured by securing support wires to a cylindrical jig onto which the screen wire is wound up with a certain pitch from a reel by rotating the jig. The screen wire supplied from the reel is secured to the support wires by welding. When a wire surface of the desired size has been formed the cylinder having the screen wires on the outer side and the support wires on the inner side is detached from the jig. After this the cylinder is cut open in its axial direction and bent to form a planar surface and further, the planar surface is bent in the opposite direction to form a cylinder so that the screen wires extend essentially in the axial direction and the support wires are parallel with the frame.

The other basic type of screen drums, the so-called wire screen drums, are usually manufactured by securing support wires to a cylindrical jig onto which the screen wire is wound up with a certain pitch from a reel by rotating the jig. The screen wire supplied from the reel is secured to the support wires by welding. When a wire surface of the desired size has been formed the cylinder having the screen wires on the outer side and the support wires on the inner side is detached from the jig. After this the cylinder is cut open in its axial direction and bent to form a planar surface and further, the planar surface is bent in the opposite direction to form a cylinder so that the screen wires extend essentially in the axial direction and the support wires are parallel with the frame.

Until recently the wire used as the screen wire has in most cases had a symmetric cross section as regards its securing point. FIG. 1 illustrates how a line $C_L$ which has been drawn via the center lines of the sides 6 and 8 of a screen wire 4 secured to a support wire 2, is perpendicular to the support wire 2. A problem with this kind of screen cylinders is that due to the limited strength of the securing of the screen wires and their support wires to each other, the screen wire tends to be turned about its more or less spot-like securing point, whereby, if this happens to one wire, the screening slot on one side grows and, correspondingly, on the other side diminishes. Due to the symmetric form of the wire, the force of the pulp flow parallel with the periphery, or at least the pulp flow parallel with the screen surface, is directed to the wire practically entirely as a moment turning the wire and breaking the securing joint.

The screen wire of the present invention aims at diminishing this problem by arranging the wire to be as asymmetric as possible whereby at least a part of the force directed to the wire is compression stress directed towards the support wire and only a part of the force tends to turn the screen wire. Further, the invention also pursues to balance the moment turning the wire by a counterforce.

On the other hand, prior art screen wires have not paid attention to all the requirements of the screening technology, but the shape of the screen wires has been very simple. In fact, the wire configuration illustrated in FIG. 1 has been fairly popular, because it has allowed approaching relatively close to the surface configuration of the PROFILE® screen plate (U.S. Pat. No. 4,529,520) developed by A. AHLSTROM CORPORATION. (Both the trademark PROFILE® and the US patent mentioned are today owned by CAE Screen Plates, Inc.) An example of the success of the PROFILE® screen drum and of the successors it has received has been described in U.S. Pat. No. 5,073,254. This application has, however, proceeded quite far from the advantageous properties found out already in connection with the PROFILE® plate. During the PROFILE® research work almost ten years ago it was stated that the flow direction in relation to the asymmetric groove in the screen surface has a great influence on the operation of the screen plate. In the screen plate studied the groove was formed of an inclined side surface and of a surface perpendicular to the screen surface between which there possibly was a bottom surface. In any case, the screening hole or slot was located relatively close to the perpendicular side surface of the groove. In the same connection, also the concepts BF (Brush Flow) and SF (Smooth Flow) were developed. BF indicates a situation in which the flow direction is such that the perpendicular side surface of the groove is, as seen from the groove, its downstream side surface and the inclined plane is its upstream side surface. Correspondingly, in a plate of the SF type, the downstream side surface is the inclined side surface, whereby the flow proceeds smoothly along the surface of the plate. In other words, the groove of a plate used as a BF type plate resisted the flow remarkably more than an SF type plate. The research work resulted in the conclusion that an SF type screen plate was best applicable practically in all applications. The US patent mentioned describes the operation of a BF type screen plate. Thus, the U.S. Pat. No. 5,073,254 either is not aware of the better operation of an SF type plate or it describes exactly the correct dimensioning with which the BF type screen plate functions. However, it should be born in mind that converting a BF type screen plate to an SF type screen plate is functionally not possible. In other words, if a groove has been dimensioned for SF type operation it will not work as a BF type groove. Neither can a groove dimensioned for BF type operation be made to word in a satisfactory way as an SF type groove.

However, neither the surface configuration illustrated in FIG. 1 nor the surface described for example in the U.S. Pat. No. 4,529,520 correspond to the present idea of an optimal screen drum. Further, the so-called PROFILE® study mentioned above did not have all the information available which has been obtained with the use of the present grooved screen plates. Previously, the initial idea was that the flow along the surface of the screen plate takes place substantially in a direction perpendicular to the grooves. However, both calculatory models and operation experience have proved that the flow on the surface of the screen plate is spiral and further, that in the upper end of the screen plate, more broadly expressed in that end of the plate in which the pulp is fed between the plate and the rotor, the flow is almost axial. Also in the lower part of the screen plate the axial component of the flow is remarkably large compared to the previous concept.

In other words, because the idea used as the basis for the design of prior art screen plates of having a flow perpendicular to the groove has been incorrect also the "optimal" groove configuration resulted has probably been to some extent wrong. The least one could do is at least to check the applicability of the groove configuration in the changed situation.

According to the present screening concept the flow on the screen drum, at least on a slot screen drum, should proceed substantially parallel with the slots whereby the accepted fiber material passes smoothly through the slot. on the other hand, because the manufacturing technique does not allow the slots to be arranged in the flow direction in a simple way, the screen plate or correspondingly a wire screen must be designed so that a diagonal flow may be treated as well as possible.

It is typical of the screen drum structure of the present invention that the design takes into account the diagonal flow of the fiber suspension over the grooves and the screen apertures, slots or holes. The structure in question allows improving the operation of a screen plate which results in the improvement of the purity of the screened pulp or in an increase in the capacity.

The characteristic features of a screen drum according to the invention are disclosed in the appended patent claims.

Figure 2:
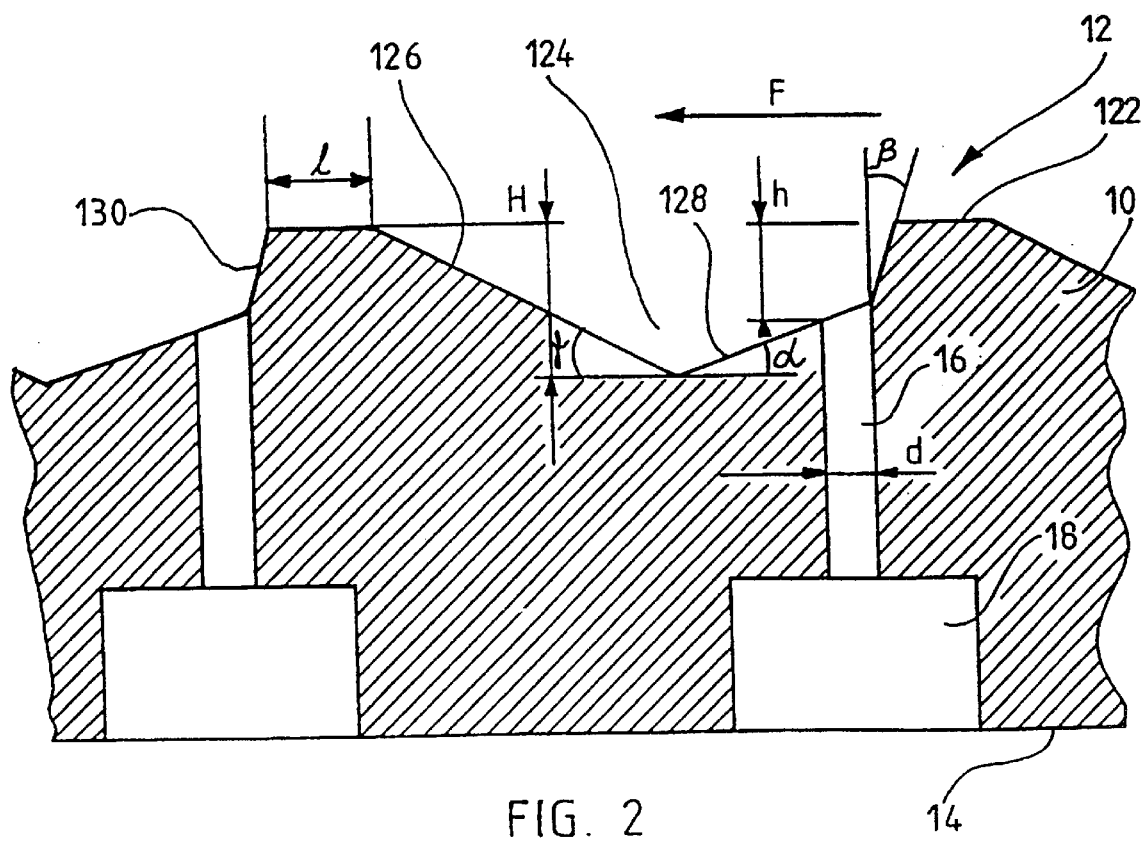
Figure 3:
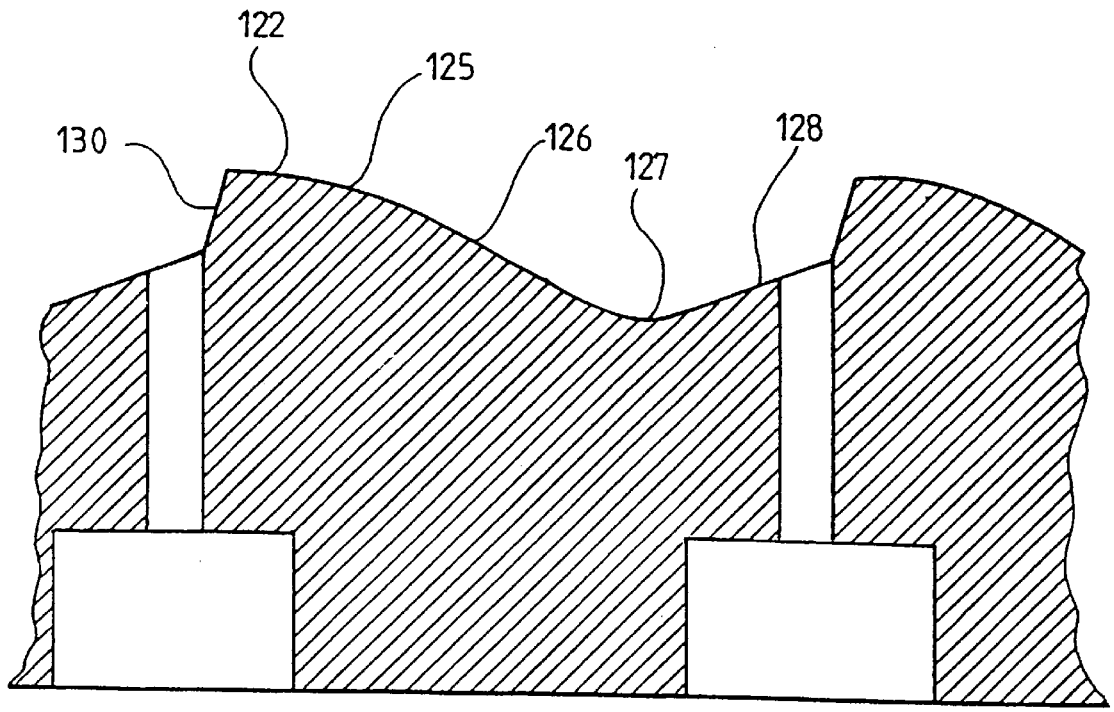
Figure 4:
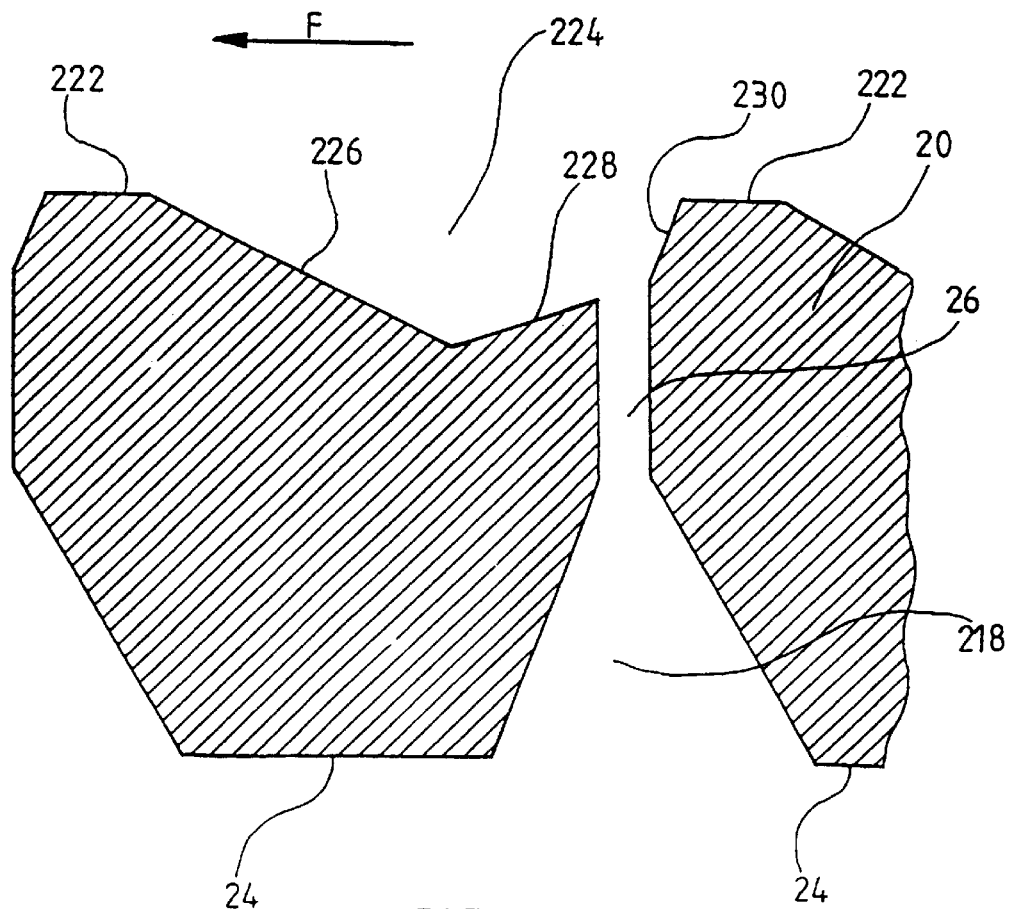
Figure 5:
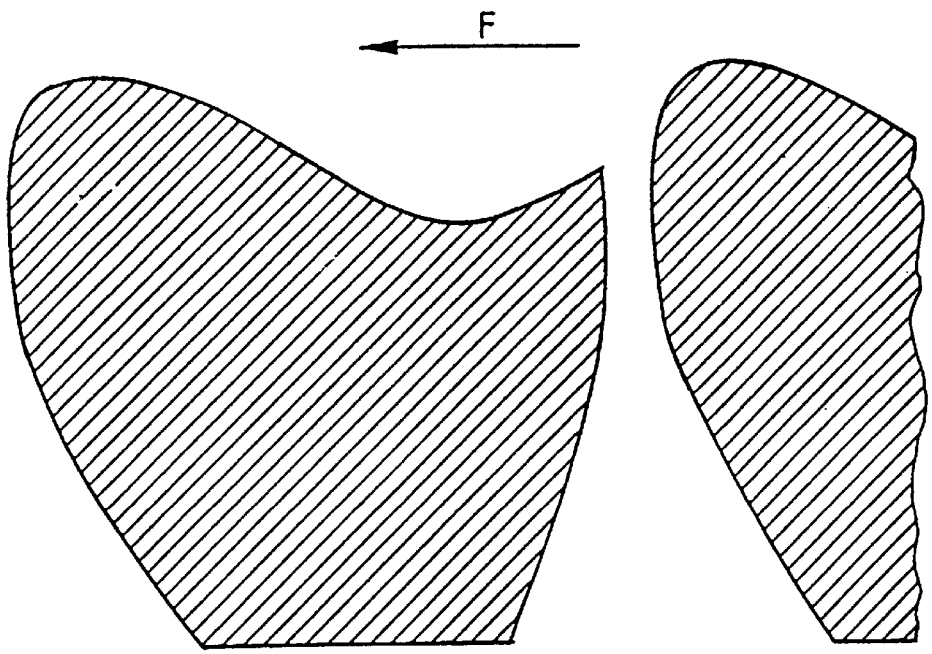
Figure 6:
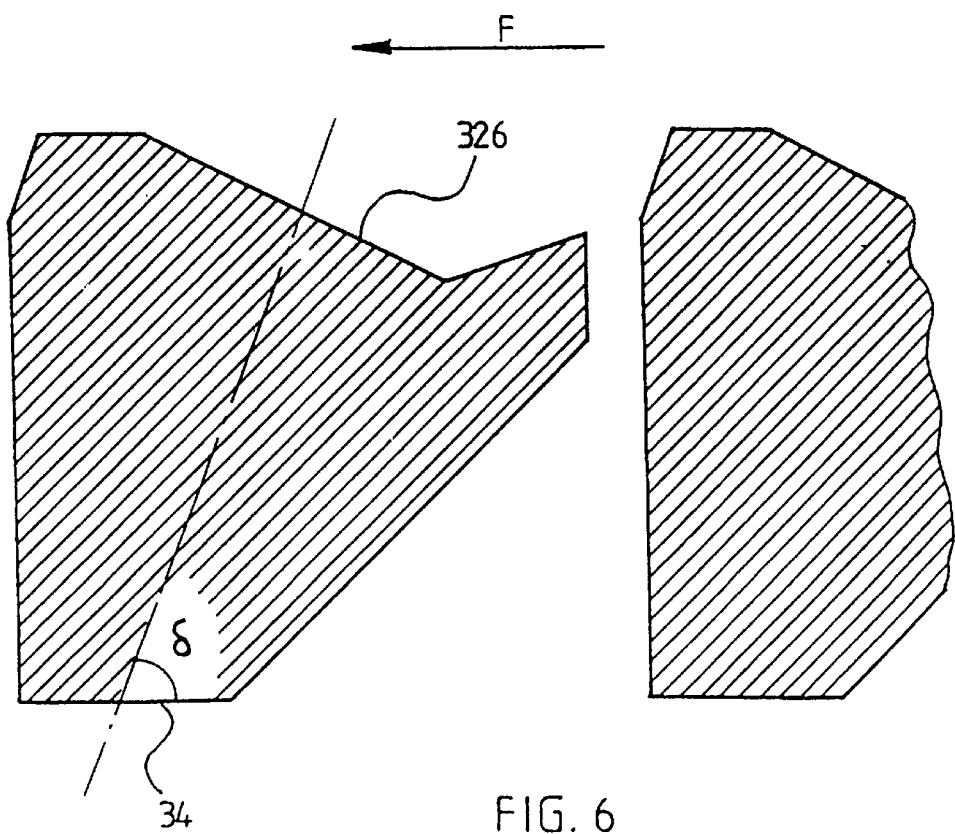
Figure 7:
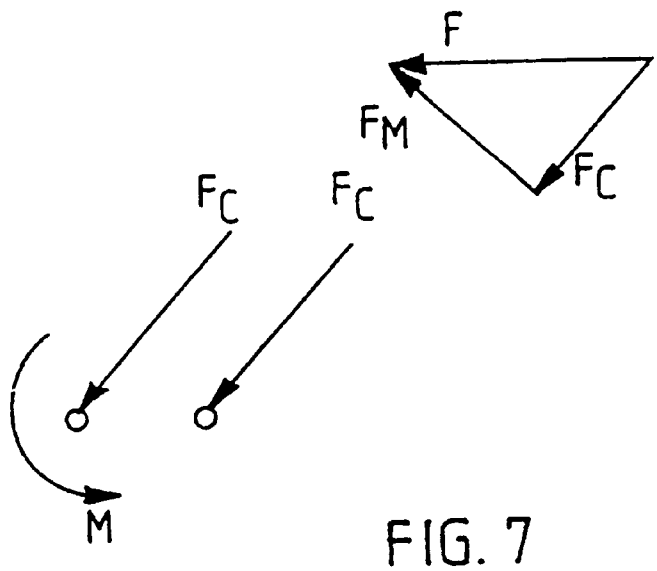
Figure 8:
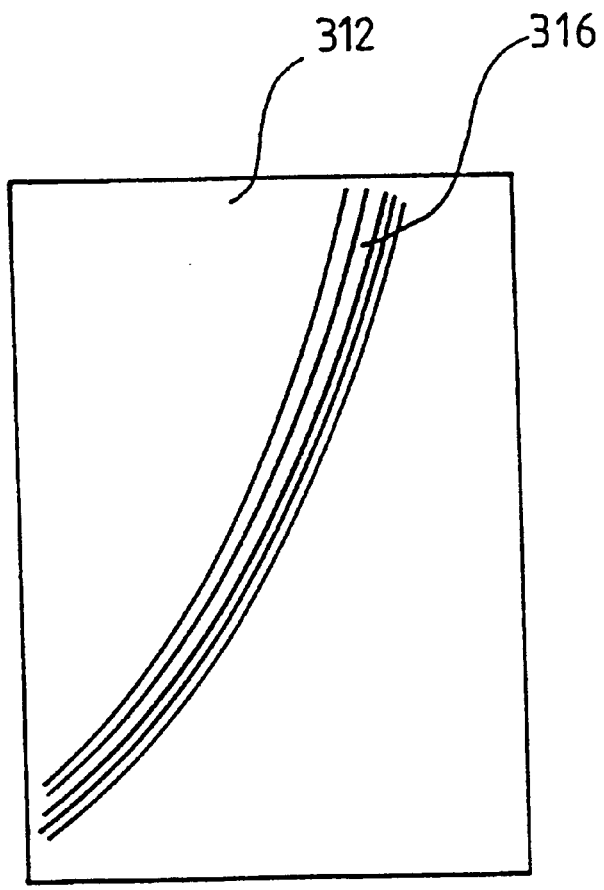

The screen drum, its operation and structure are explained in more detail below with reference to the accompanying drawings of which FIG. 1 illustrates a prior art wire screen drum, FIG. 2 illustrates a detailed cross section of a screen drum according to a preferred embodiment of the invention, FIG. 3 illustrates a detailed cross section of a second screen drum according to a preferred embodiment of the invention, FIG. 4 illustrates a detailed cross section of a third screen drum according to a preferred embodiment of the invention, FIG. 5 illustrates a detailed cross section of a fourth screen drum according to a preferred embodiment of the invention, FIG. 6 illustrates a detailed cross section of a fifth screen drum according to a preferred embodiment of the invention, FIG. 7 illustrates schematically the advantages of the asymmetric screen wire of FIG. 6 compared with prior art screen wires, FIG. 8 illustrates yet another preferred embodiment of the invention.

As already stated, FIG. 1 illustrates a cross section of a prior art wire screen drum disclosing that the center line $C_L$ of the screen wire 4 is substantially perpendicular to the support wire 2. This has the consequence that the flow in the direction of arrow F imposes a moment turning the screen wire 4 in the securing point of the support wire 2 and the screen wire 4.

FIG. 2 illustrates a cross section of a preferred embodiment of a screen plate according to the invention disclosing the exact surface configuration of the screen plate. The screen plate 10 of the figure comprises mainly a surface 12 facing the suspension to be screened, a surface 14 facing the screened suspension, and between these, screen apertures 16 which may be either holes or slots. Recesses 18, which are large compared to the screen apertures 16, have been machined in the latter surface 14 which have either a cylindrical or an elongated form depending in most cases on whether the screen apertures 16 are holes or slots. The surface 12 facing the suspension to be screened comprises several parts. In the embodiment illustrated in FIG. 2, the surface 12 comprises a surface 122, which is substantially parallel with the screen drum surface and has a width l, and a groove 124. In the embodiment of the figure, the groove 124 comprises three surfaces, i.e. compared to the fiber suspension flow direction F, a downstream side surface 126, a bottom surface 128 and an upstream side surface 130.

In tests performed we have compared a plate illustrated in FIG. 1 with a PROFILE® screen plate which differs from the plate of the present invention in that the bottom surface of the groove of a PROFILE® plate is flat or there is no bottom surface. The tests clearly proved that by raising the upstream side edge of the bottom surface 128 the purity of the screened pulp improved remarkably compared to a flat bottom surface. The tests proved that the purity of the pulp is the best when the inclination α of the bottom is 5–30 degrees. An excessive lowering of the groove on the other hand resulted in a reduction of the capacity. Further, it was discovered that by increasing the depth H of the groove, pulp of somewhat higher consistency could be treated. Further, increasing the depth of the groove increases the capacity of the screen plate by increasing the turbulence on the surface of the plate. The test showed that the optimal depth of the grooves is 0.3–2 mm. Correspondingly, a height of the upstream side edge of the groove of 0.1–1.5 mm gave the best purity of the pulp. The inclination angle γ of the downstream side surface 126 varied in the test between 30 and 60 degrees; for the operation of the common screen plate in most applications, the most advantageous angle range proved to be 30–45 degrees. The test also studied the direction β of the upstream side surface 130 and inclining the surface mentioned towards the direction indicated in the figure was found to have a noticeable although marginal effect on the capacity of the plate so that the capacity improved to some extent when the surface was inclined. The tests proved 0–15 degrees to be the most advantageous reading for the angle β.

By arranging the bottom to rise in the way described above the reject particle may be in a way collected onto the bottom of the groove both by means of the centrifugal force and because the stiffer reject particles do not pass into the screen apertures but drift over them to the bottom of the groove.

FIG. 3 illustrates another preferred embodiment of the invention, in which the screen plate according to FIG. 2 has been used but modified so that the surface 122 parallel with the screen drum surface and the adjacent surface 126 of FIG. 2 have been connected by a curved surface 125. Of course the surface 125 may start from the upper edge of the surface 130 in which case there is no essentially planar surface 122. It is also possible to arrange a planar surface between the surfaces 122 and 126 of FIG. 2 to replace the curved surface illustrated in FIG. 3. The purpose of connecting the surfaces 122 and 126 by an intermediate surface described in this embodiment is to calm the flow on the surface of the screen plate as sudden pressure strokes, even minute ones, have been found to have detrimental effects on the screening result.

FIG. 3 illustrates correspondingly, how a curved connecting surface 127 may be provided between the groove bottom surface 128 and the downstream side surface 126. The radius of curvature of the surface 127 is limited only by the desired depth H of the groove.

FIG. 4 illustrates a third preferred embodiment of the invention in which the screen plate illustrated in FIG. 2 has in fact been converted into a wire screen structure. In the figure, the plate portion between the two screen apertures 16 of FIG. 2 has in FIG. 4 been replaced by a screen wire which has many resemblances but also a few differences compared with FIG. 2. Firstly, the surface facing the pulp to be screened is practically similar with the exception of course that the screening slot 26 is substantially longer than in a screen plate. In a wire screen drum the screening slot may extend even over the whole height of the drum if the drum is not composed of several shorter portions. The differences compared with a drum made of a screen plate are to be found on the side facing the screened pulp where, firstly, the screen wires 20 have been secured by their surface 24 to support wires (not illustrated). Further, the cylindrical or trough-shaped recesses 18 (FIG. 2) serving as continuations of the screen apertures in the screen plate have been replaced in the wire screens by narrowing the wire towards the support surface 24 whereby an open space 218 widening evenly is created between the wires on the accept pulp side.

FIG. 5 illustrates an embodiment corresponding to FIG. 3, made of screen wire. In other words the surfaces facing the pulp to be treated have been rounded during manufacture to correspond to the alternative structures presented in connection with FIG. 3.

FIG. 6 illustrates yet another preferred embodiment of a screen wire application according to the invention. An essential feature of the screen wire 30 illustrated is that the center line $C_L$ of the wire drawn via the center line, which is parallel with the wire, of the support surface 34, and via the center line, which is parallel with the wire, of the wire on the side facing the pulp to be treated, or if desired of the downstream side surface 326 of the groove, forms a sharp angle δ with the plane of the support surface 34. An essential feature in the embodiment of FIG. 6 is that the center line $C_L$ of the screen wire is directed for the angle δ towards the flow direction F of the suspension. Thus it may be concluded as illustrated in FIG. 7 that the force F directed from the suspension flow to the wire is divided in two components; a component $F_C$ parallel with the center line of the wire, and a component $F_M$ perpendicular to the center line of the wire. The component $F_C$ parallel with the center line of the wire creates compression stress in the joint of the screen wire and the support wire. When a support wire welded at both sides is used the force $F_C$ is imposed on both the welded joints. This kind of a compression stress as such is in practice harmless as it produces a load exerting almost a radial influence on the annular support wire which the wire easily endures. The component $F_M$ perpendicular to the center line creates a moment M turning the screen wire around its second securing point. It is apparent from FIG. 7 that the force $F_C$ acting on the right side securing point tends to resist the moment M, i.e. tends to turn the screen wire in the opposite direction compared with the moment M. Thus the result is that the screen wire has been secured so that the stress imposed on the securing points is reduced from the one obtained previously whereby the durability of the screen drums has been further improved from the one obtained by previous securing methods.

FIG. 8 still illustrates a screen drum manufactured according to the present screening technology. In the drum of the figure the screening slots have been arranged in the direction of flow between the drum and the rotor. In other words, in the upper section of the drum the screening slots are almost parallel with the axis of the drum and their direction turns more and more peripheral towards the lower portion of the drum. The upper section of the drum means the feed end of the drum at which the fiber suspension to be treated flows to the space between the drum and the rotor. Correspondingly, the lower section of the drum means the discharge end of the drum from which both the so-called accept and the so-called reject are discharged from the screen. The slots may be continuous, i.e. curved in the way illustrated in FIG. 8 or they may be straight so that their inclination angle changes gradually.

As may be understood from the above, a new type of a screen cylinder has been developed which reduces the weaknesses of prior art screen drums and takes the modern screening theory into account. It should be noted that only a few preferred exemplary embodiment of the screen constructions according to the invention have been presented above. Thus it is clear that the scope of the invention includes all the variations and modifications of the invention defined by the appended patent claims.

We claim:

1. A screen cylinder including a rotationally symmetric screen surface located on a side of the screen having pulp to be screened, and support rings supporting the screen surface on an opposite side thereof, the screen surface being mainly formed of grooves and of screen apertures located in connection with the grooves, the grooves in turn including an upstream side surface, a bottom surface, and a downstream side surface, wherein the bottom surface of the groove rises towards the upstream side surface, and the screen apertures are located substantially near a junction of the bottom surface and the upstream side surface, wherein an inclination angle a of the bottom surface is about 5–30 degrees and an inclination angle β of the upstream side surface relative to a level perpendicular to the screen surface is about 0–15 degrees.

2. The apparatus of claim 1, wherein the screen surface includes a screen plate in which the grooves and the screen apertures have been machined.

3. The apparatus of claim 1, wherein the screen surface is formed of screen wires so that the screening apertures are formed between two adjacent screen wires whereby the downstream side surface and the bottom surface of the groove are in one screen wire and the upstream side surface in the adjacent screen wire.

4. The apparatus of claim 1, wherein the depth of the groove in the junction of the bottom surface and the downstream side surface is 0.3–2.0 mm.

5. The apparatus of claim 1, wherein the depth of the groove in the junction of the bottom surface and the upstream side surface is 0.1–1.5 mm.

6. The apparatus of claim 1, wherein the center line CL of the screen wire forms a sharp angle with the periphery of the screen cylinder so that the force directed to the screen wire causes among other things a compression stress in the securing point of the screen wire.

7. The apparatus of claim 1, wherein the screen surface further comprises a surface running axially with the periphery of the screen cylinder and having a length of 0–2.5 mm.

8. The apparatus of claim 1, wherein the direction of slots present within a screen drum changes at different heights of the drum according to a flow between the drum and a rotor so that the direction of the slots is close to the direction of the flow.

9. The screen cylinder of claim 8, wherein the direction mentioned of the slots changes continuously.

10. A screen cylinder as claimed in claim 8, wherein the direction mentioned of the slots changes step by step.

11. An apparatus as claimed in claim 2, characterized in that the screen surface is formed of screen wires so that the screening apertures are formed between two adjacent screen wires whereby the downstream side surface and the bottom surface of the groove are in one screen wire and the upstream side surface in the adjacent screen wire.

* * * * *

UNITED STATES PATENT AND TRADEMARK OFFICE
CERTIFICATE OF CORRECTION

PATENT NO.     : 6,119,867
DATED          : September 19, 2000
INVENTOR(S)    : Ljokkoi et al.

It is certified that error appears in the above-identified patent and that said Letters Patent is hereby corrected as shown below:

<u>Title page,</u>
Assignee, "Ahlmstrom" should read -- Ahlstrom --;

Item [56] References Cited, U.S. PATENT DOCUMENTS,
"5,128,026" should read -- 5,128,028 --; and insert the following references:
-- 4,529,520   07/1985   Lampenius
   4,812,229   03/1989   Tra
   5,000,842   03/1991   Ljokkoi
   5,073,254   12/1991   Beisenherz et al. --;

FOREIGN PATENT DOCUMENTS,
-- EP 236 843        09/1987   EPO
   DE 39 27 202 A1   02/1991   Germany
   WO 87/03024       05/1987   PCT --

<u>Column 1,</u>
Lines 44-57, delete entire paragraph, as it is duplicated in the following paragraph (beginning at Col. 1, line 58 through Col. 2, line 4)

<u>Column 3,</u>
Line 6, "word" should read -- work --
Line 34, "on" should read -- On --

Signed and Sealed this

Second Day of April, 2002

Attest:

*Attesting Officer*

JAMES E. ROGAN
*Director of the United States Patent and Trademark Office*